United States Patent
Haggstrom

(10) Patent No.: US 10,618,482 B2
(45) Date of Patent: Apr. 14, 2020

(54) BUMPER BEAM

(71) Applicant: Gestamp Hardtech AB, Lulea (SE)

(72) Inventor: Tony Haggstrom, Rosvik (SE)

(73) Assignee: Gestamp Hardtech AB, Lulea (SE)

( * ) Notice: Subject to any disclaimer, the term of this patent is extended or adjusted under 35 U.S.C. 154(b) by 31 days.

(21) Appl. No.: 15/770,547

(22) PCT Filed: Dec. 2, 2016

(86) PCT No.: PCT/SE2016/051203
§ 371 (c)(1),
(2) Date: Apr. 24, 2018

(87) PCT Pub. No.: WO2017/099651
PCT Pub. Date: Jun. 15, 2017

(65) Prior Publication Data
US 2019/0061658 A1 Feb. 28, 2019

(30) Foreign Application Priority Data

Dec. 8, 2015 (SE) ...................................... 1551608

(51) Int. Cl.
*B60R 19/02* (2006.01)
*B60R 19/12* (2006.01)
(Continued)

(52) U.S. Cl.
CPC ............ *B60R 19/023* (2013.01); *B60R 19/12* (2013.01); *B60R 19/18* (2013.01); *B60R 19/34* (2013.01)

(58) Field of Classification Search
CPC ....... B60R 19/023; B60R 19/18; B60R 19/34; B60R 2019/1806
(Continued)

(56) References Cited

U.S. PATENT DOCUMENTS 6,059,331 A    5/2000  Mori
6,439,650 B2 * 8/2002  Artner ................. B62D 21/152
                                                    293/102
(Continued)

FOREIGN PATENT DOCUMENTS

DE    102008039513    2/2010
DE    202011051008    9/2011
(Continued)

*Primary Examiner* — Gregory A Blankenship
(74) *Attorney, Agent, or Firm* — Mark P. Stone

(57) ABSTRACT

The invention relates to a bumper beam (B) comprising an elongate main cross member (1) arranged to be horizontally attached to two crash boxes (3) at attachment portions (4) close to the respective ends of the main cross member (1), the bumper beam (B) having an inner side arranged to attach to outer ends of the crash boxes (3) and an opposite outer side, wherein the main cross member (1) further comprises a mid-portion (5) between said attachment portions (4), and wherein an off-set member (2) is arranged at each attachment portion (4). The off-set members (2) comprise a proximal web (6) extending inwards from the main cross member (1), a distal web (7) extending outwards to an end rim (10) from an inner part (8) joining the proximal web (6) to the distal web (7). The distal web (7) extends on a distance from the proximal web (6) so as to form an opening between the proximal web (6) and the distal web (7), wherein a support portion (12) is arranged along the proximal web (6), which support portion (12) is arranged to face a longitudinal side of the adjacent crash box (3).

20 Claims, 4 Drawing Sheets

(51) Int. Cl.
  *B60R 19/18* (2006.01)
  *B60R 19/34* (2006.01)
(58) Field of Classification Search
  USPC .......................................................... 293/102
  See application file for complete search history.

(56) References Cited

U.S. PATENT DOCUMENTS

| | | | | |
|---|---|---|---|---|
| 6,485,072 B1* | 11/2002 | Werner | ................... | B60R 19/12 |
| | | | | 293/120 |
| 6,520,552 B2* | 2/2003 | Schroter | ................. | B60R 19/34 |
| | | | | 293/120 |
| 7,357,432 B2* | 4/2008 | Roll | ........................ | B60R 19/18 |
| | | | | 293/120 |
| 7,959,197 B2* | 6/2011 | Agrahari | ................. | B60R 19/18 |
| | | | | 293/102 |
| 8,123,265 B2* | 2/2012 | Nilsson | ................... | B60R 19/18 |
| | | | | 293/133 |
| 8,152,210 B2* | 4/2012 | Lutke-Bexten | ......... | B60R 19/18 |
| | | | | 293/102 |
| 9,187,054 B2* | 11/2015 | Handing | ............... | B60R 19/023 |
| 2005/0052036 A1* | 3/2005 | Gioia | .................... | B60R 19/445 |
| | | | | 293/102 |
| 2007/0040398 A1* | 2/2007 | Lutke-Bexten | ......... | B60R 19/18 |
| | | | | 293/102 |
| 2008/0203740 A1* | 8/2008 | Mellis | .................... | B60R 19/18 |
| | | | | 293/102 |
| 2009/0066095 A1* | 3/2009 | Karlander | ............... | B60R 19/18 |
| | | | | 293/102 |
| 2009/0096223 A1* | 4/2009 | Asplund | ................. | B60R 19/18 |
| | | | | 293/102 |
| 2009/0102210 A1* | 4/2009 | Tanskanen | ............... | B60R 19/34 |
| | | | | 293/133 |
| 2009/0273197 A1* | 11/2009 | Muskos | ................. | B60R 19/023 |
| | | | | 293/132 |
| 2010/0133861 A1* | 6/2010 | Lutke-Bexten | ......... | B60R 19/18 |
| | | | | 293/120 |
| 2011/0227798 A1* | 9/2011 | Hsu | ........................ | H01Q 1/243 |
| | | | | 343/702 |
| 2014/0203576 A1* | 7/2014 | Handing | ................. | B60R 19/18 |
| | | | | 293/102 |
| 2015/0097384 A1* | 4/2015 | Conrod | ............... | B21B 15/0007 |
| | | | | 293/102 |
| 2017/0021788 A1* | 1/2017 | Arns | ....................... | B60R 19/18 |
| 2017/0066394 A1* | 3/2017 | Nilsson | ................... | B60R 19/18 |
| 2018/0281710 A1* | 10/2018 | Lindblom | ............... | B60R 19/18 |
| 2018/0370470 A1* | 12/2018 | Hultkvist | ............... | B60R 19/34 |
| 2019/0061658 A1* | 2/2019 | Haggstrom | ........... | B60R 19/023 |

FOREIGN PATENT DOCUMENTS

| | | |
|---|---|---|
| WO | WO 2005/090128 | 9/2005 |
| WO | WO 2007/136320 | 11/2007 |
| WO | WO 2014/142733 | 9/2014 |

* cited by examiner

BUMPER BEAM

FIELD OF THE INVENTION

The invention relates to a bumper beam for arrangement on a crash box of a vehicle, and more particular to a bumper beam having a support portion arranged to improve performance in off-set bumper-to-bumper collisions.

BACKGROUND OF THE INVENTION

Bumper beams are used on vehicles, such as cars, to absorb the major portion of the forces in a frontal collision. Normally a bumper beam is arranged both in the front and in the rear of a vehicle.

Vehicles with the same body in white but with different wheel suspensions, will have the bumper beams located at different heights depending on the vehicle height. In a bumper-to-bumper collision between cars of different heights the bumpers will be vertically offset with respect to each other. In such cases the damages to the vehicles and the persons inside the vehicles may be much more severe, due to the fact that the impact forces are not absorbed in the manner the vehicles are built for.

From WO2005/090128 A1 a bumper beam is known, which has a profile that is adapted to better cope with off-set collisions.

There is however still a desire to produce a bumper beam having a geometry that makes it cope even better with vertically offset impacts, especially to reduce the risk that the vehicles will underride/override each other. It is also desired that the improved functionality for offset impacts is achieved without negatively affecting other performances of the bumper beam, and preferably without adding substantial weight.

OBJECT OF THE INVENTION

An object of the invention is to achieve a bumper beam that is arranged to provide a good load handling in case of vertically offset impacts, so as to minimise the risk of underride/override.

A further object is to achieve such a bumper beam without substantially increasing the weight.

BRIEF DESCRIPTION OF THE INVENTION

These objects are achieved by the invention by means of a bumper beam comprising an elongate main cross member arranged to be horizontally attached to two crash boxes at attachment portions close to the respective ends of the main cross member, the bumper beam having an inner side arranged to attach to outer ends of the crash boxes and an opposite outer side arranged to constitute the outer surface of the bumper beam, wherein the main cross member further comprises a mid-portion between said attachment portions, and wherein an off-set member is arranged at each attachment portion, above or below the main cross member. The off-set members comprise a proximal web extending inwards from the main cross member, a distal web, and an inner part connecting the proximal web to the distal web, wherein the distal web extends outwards of and on a distance from the proximal web so as to form an opening there between, wherein a support portion is arranged along the proximal web, which support portion is arranged to face longitudinal sides of the crash boxes.

In a specific embodiment of the invention the bumper beam includes crash boxes, one arranged to each attachment portion of the main cross member. The bumper beam may also be arranged on a vehicle with a fixed crash box or on the side girders of a vehicle, in manner that allows the off-set member to interact with the side girder.

Preferably, the support section of each off-set member is arranged to be in sliding contact with the respective crash box.

Preferred embodiments are defined in the dependent claims.

BRIEF DESCRIPTION OF THE DRAWINGS

The invention is described in more detail below with reference to the non-limiting embodiments shown on the appended drawings, in which.

DESCRIPTION OF PREFERRED EMBODIMENTS

In the below description the inventive bumper beam is described as a front bumper beam. The invention is however not limited to a front bumper beam but also relates to a rear bumper beam.

Figure 1:
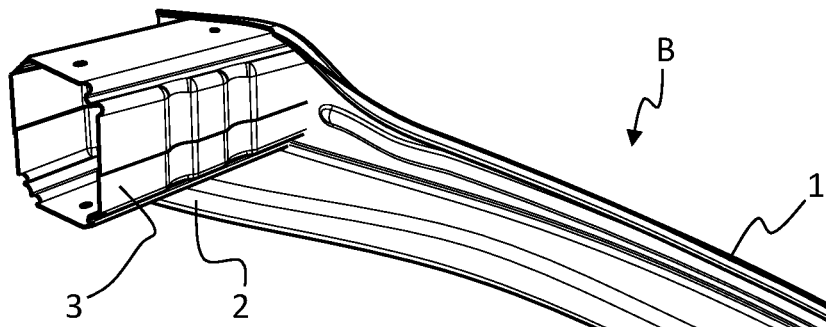
FIG. 1 is a perspective inside view of a first embodiment of a bumper beam in accordance with the invention.
Figure 3:
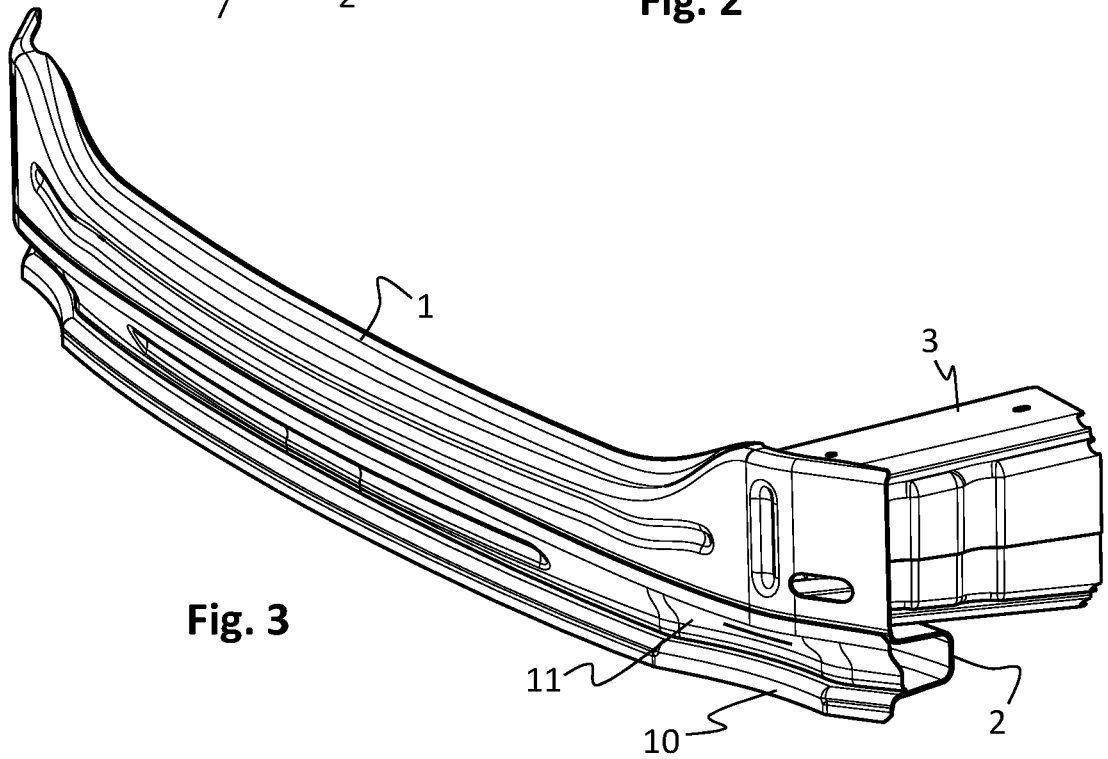
FIG. 3 is a perspective outside view of the bumper beam of the first embodiment.

In FIG. 1 a bumper beam B according to a specific embodiment of the invention is shown in perspective from the inside of the bumper beam, the inside referring to the side of the bumper beam B that is not visible when the bumper beam is arranged on a vehicle, i.e. the side facing the vehicle. In FIG. 3, the same bumper beam is shown in a perspective view from the outside, i.e. the side that will constitute the outer side of the vehicle.

Throughout this application "inside" is intended to signify the side of the bumper beam facing the vehicle when attached to a vehicle, "outside" is intended to signify the side of the bumper beam facing the vehicle's outside, hence forward for a front bumper beam and backwards for a rear bumper beam. Further, "upwards" and "downwards" signify the directions of the bumper beam when attached to a vehicle.

Figure 2:
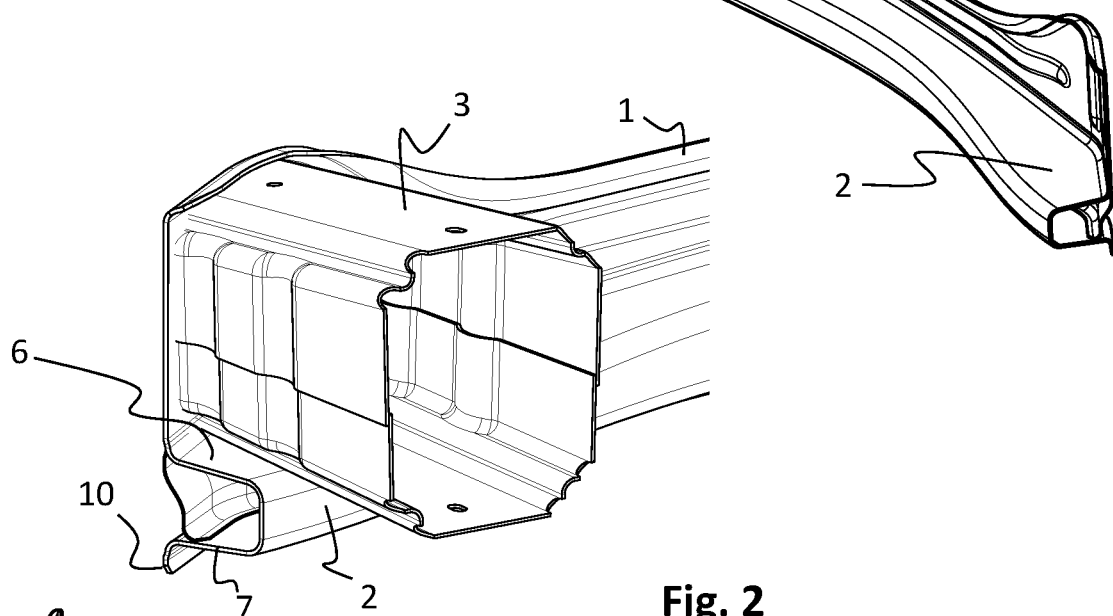
FIG. 2 is a detailed inside view of the bumper beam according to the first embodiment and a crash box to which the bumper beam may be attached.

FIG. 2 is a detailed view of an inside view from an opposite side of the crash box 3 than what is represented in FIG. 1.

The bumper beam B comprises an elongate main cross member 1 comprising attachment portions 4 close to its respective ends, which are configured to be horizontally attached to two crash boxes 3, whereof only one is shown in the figures. The main cross member 1 further comprises a mid-portion 5 between said attachment portions 4.

The bumper beam B has an inner side arranged to face the crash boxes 3 and an opposite outer side, which is arranged to constitute the outer surface of a bumper beam B on the front or the rear end of a vehicle. In other words no additional details other than a surface coating or the like is provided outside of the bumper beam.

The bumper beam B further comprises an off-set member 2 that extends over each attachment portion 4. The off-set member 2 is fixedly attached to said main cross member 1. In the shown embodiment the off-set members 2 are integral parts of the bumper beam, such that the main cross member 1 and the off-set member 2 are made in one piece. It may however also consist of several parts that are joined by solder, glue, rivets or the like.

Figure 4:
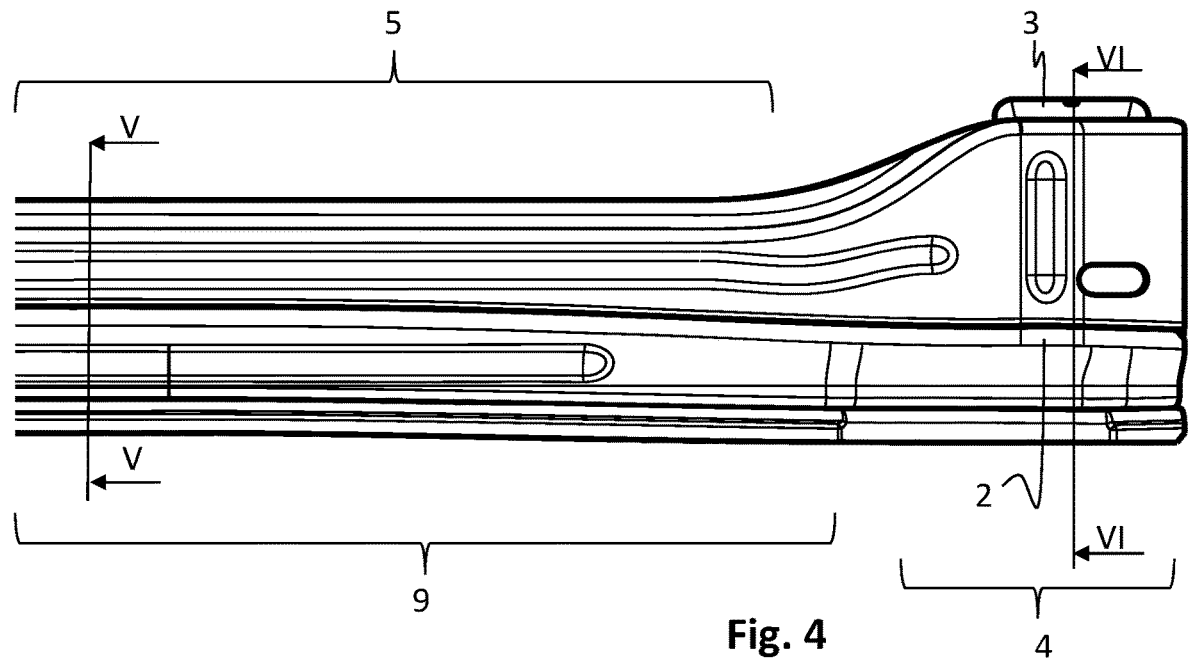
FIG. 4 is an outside view of the bumper beam of the first embodiment.
Figure 5:
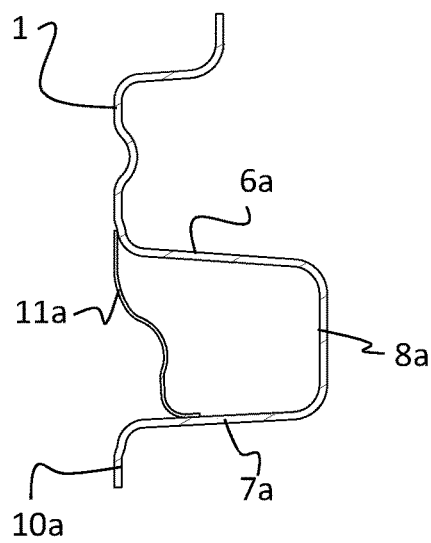
FIG. 5 is a cross sectional view of the bumper beam of the first embodiment, taken along the line V-V in FIG. 4.
Figure 6:
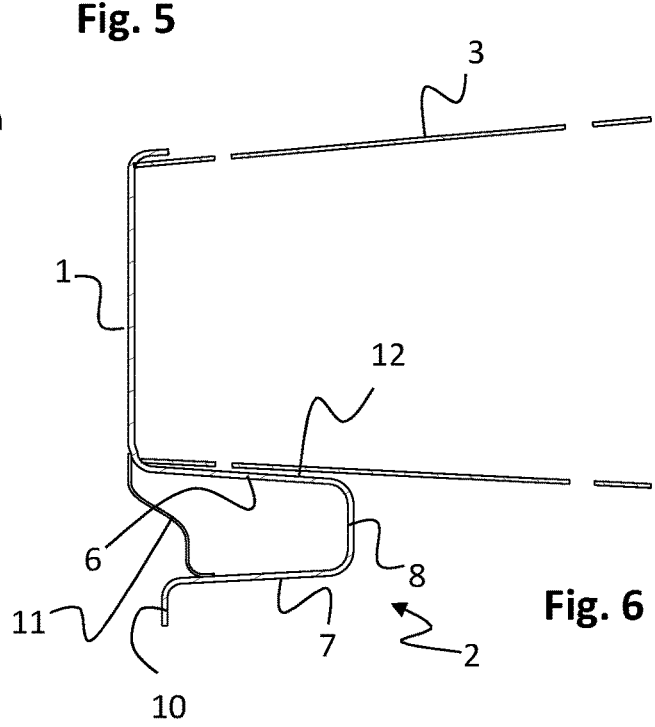
FIG. 6 is a cross sectional view of the bumper beam of the first embodiment, taken along the line VI-VI in FIG. 4.

In FIG. 4 the bumper beam B is shown from the outside and FIGS. 5 and 6 are cross sectional views of the bumper beam B 2 along the lines V-V and VI-VI, respectively, in FIG. 4.

In FIG. 6 the profile of the first embodiment of the off-set member 2 is represented. The profile, which may be described as a hat profile, comprises a proximal web 6 that extends inwards from the main cross member 1, close to and substantially parallel to the adjacent crash box 3. The term proximal signifies that it is proximal, i.e. positioned close, to the main cross member, wherein the term distal signifies that is positioned relatively farther away from the main cross member 1. The term substantially parallel is supposed to indicate that the distance between the proximal web and the surface of the crash box is about the same along the length of the proximal web. A distal web 7 is arranged on a distance from the crash boxes 3, such that an opening is formed between the distal and the proximal web. An inner part 8 is arranged to connect the distal web 7 to the proximal web 6. In the off-set member 2 of the first embodiment the inner part 8 comprises a vertical web forming a distance between the proximal and distal web.

An end rim 10 is arranged on the distal web 7, which end rim 10 extends vertically away from the main cross member 1 in the shown embodiment. The end rim 10 may however also be comprised of a more abrupt ending of the distal web 7, without a specific extension in the direction away from the main cross member 1. Further, in order to cover the opening between the webs 6 and 7, and to mechanically strengthen the structure of the off-set member 2 a cover portion 11 is arranged between the outer parts of the webs 6 and 7. The cover portion 11 may be fastened by means of solder, glue, rivets or the like.

As may be seen in FIG. 4 the off-set members 2 of the first embodiment are connected by a middle off-set profile 9. The profile of the middle off-set profile 9 is shown in cross section in FIG. 5. In this first embodiment of the bumper beam B the middle off-set profile 9 has substantially the same profile as the off-set members 2 it interconnects. Hence, as is illustrated in FIG. 5, the middle off-set profile 9 comprises a proximal web 6a, a distal web 7a, and an inner web 8a interconnecting the proximal web 6a and the distal web 7a.

The inventive geometry is chosen so as to prevent unwanted turning of the bumper and to thereby minimise the risk for override/underride in the event of a collision. In the shown embodiment the off-set member 2 is arranged vertically below the main cross member 1. It may however just as well be located above the main cross member 1. For a vehicle with a high suspension the off-set member 2 makes most use below the main cross member 1 for providing an increased impact tolerance to an impact with a vehicle of a relatively lower height, e.g. vehicles of normal to low height. For lower vehicles the off-set member 2 is preferably arranged above the main cross member 1, for providing an increased impact tolerance to a collision with vehicles of a relatively higher height, and for vehicles of average height off-set members may be arranged both above and below the main cross member 1.

In a collision where the bumper beam B of the shown embodiment will have an impact point at the lower part of the main cross member 1 and below, the distal web 7 will be pushed inwards whereby a torque will act on the off-set member 2. The interaction between the proximal web 6 and the lower side of the crash box 3 will however act to prevent the bumper beam from rotating counter clock-wise in the figure. The proximal web includes a support portion 12, which in the first embodiment extends for almost the whole length of the proximal web 6 and which will act on the lower side of the crash box 3. Due to the interaction between the support portion 12 of the off-set member 2 and the underside of the crash box 3 the torque will be projected inwards through the crash box 3. This is of course advantageous as the crash box 3 is dimensioned to cope with big impact forces. Preferably, the support section 12 is not fixed to the crash box 3. Instead it is allowed to slide with respect to the crash box. A sliding interaction will minimise the transition of off-set torsions so as to improve the contribution forces in a manner that the crash box 3 is built for.

The lengths of the proximal web 6 and distal web 7 are preferably such that the end rim 10 is substantially in line with the outer side of the bumper beam B. Substantially in line is in this context intended to signify that with respect to a vertical line the outer side of the bumper beam B and the end rim 10 are at substantially at the same distance from said line. Typically, the end rim 10 is located not more than 5 cm inside of the outer side of the bumper beam B, preferably less than 2.5 cm, and more preferably less than 1 cm.

Figure 7:
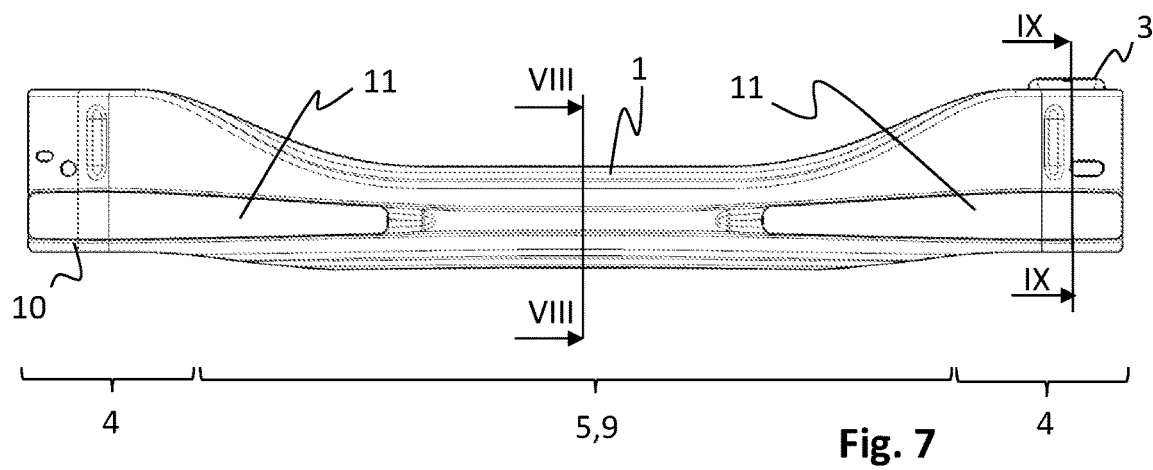
FIG. 7 is an outside view of a bumper beam according to a second embodiment.
Figure 8:
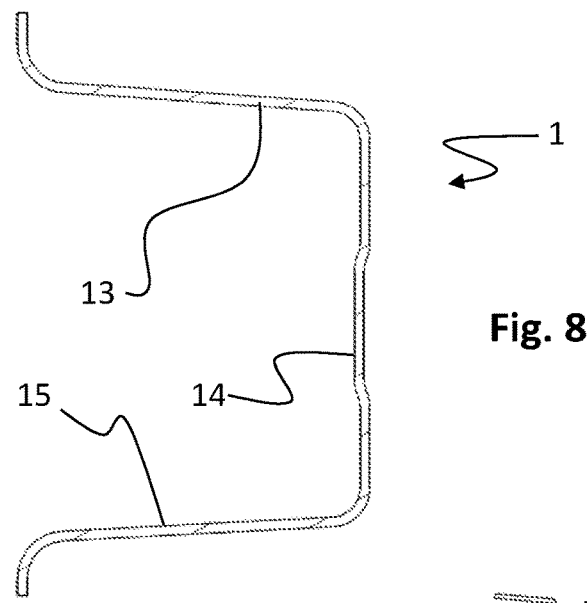
FIG. 8 is a cross sectional view of the bumper beam of the second embodiment, taken along the line VIII-VIII in FIG. 7.
Figure 9:
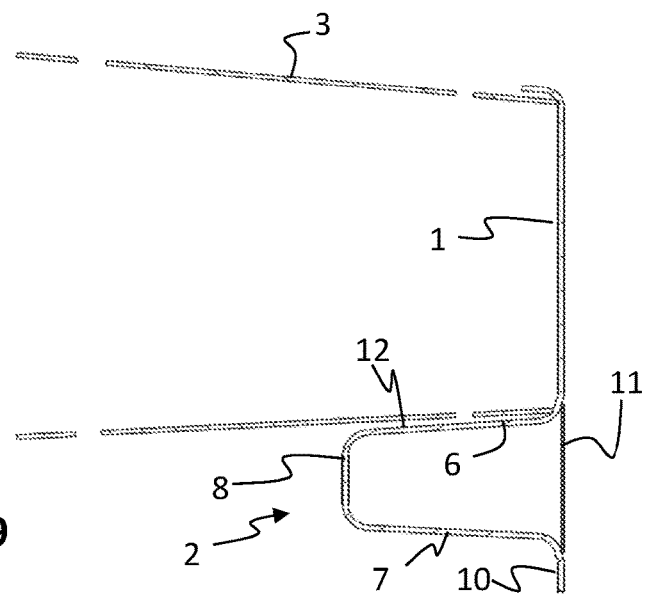
FIG. 9 is a cross sectional view of the bumper beam of the second embodiment, taken along the line IX-IX in FIG. 7.

A second embodiment of the bumper beam according the invention is shown in FIGS. 7-9. In this second embodiment the off-set member 2 has substantially the same shape as the off-set member of the first embodiment. In contrast to the bumper beam of the first embodiment the mid portion 5 incorporates the middle off-set profile 9 so as to form a single hat profile as illustrated in FIG. 8, which is a cross-sectional view taken along the line VIII-VIII in FIG. 7. This hat profile is substantially symmetric having an upper and a lower web 13 and 15, respectively, and an outer web 14 connecting the upper and lower webs.

FIG. 9 is a cross-sectional view of the off-set member 2 taken along the line IX-IX in FIG. 7. As is apparent from FIG. 9 the off-set member 2 of the second embodiment includes a proximal web 6, a distal web 7 that are interconnected by an inner part 8 in the form of an inner web.

As for the first embodiment the support portion 12 of the off-set member 2 extends for the major part of the proximal web 6. The cover portion 11 extends over the off-set member but is ended in the mid portion 5 where the profile of the off-set member has been phased out and transitioned into the profile as represented in FIG. 8. Further, in contrast to the cover portion 11 of the first embodiment, the cover portion 11 is attached to the vertical parts of the off-set member. This difference is however mostly a question of design and has little influence on the structural strength of the off-set member. In one advantageous embodiment the bumper beam is formed in one piece, except for the cover portion 11, which is arranged to cover the opening between the proximal web 6 and the distal web 7. The cover portion 11 may be attached by soldering or gluing or the like.

Figure 10:
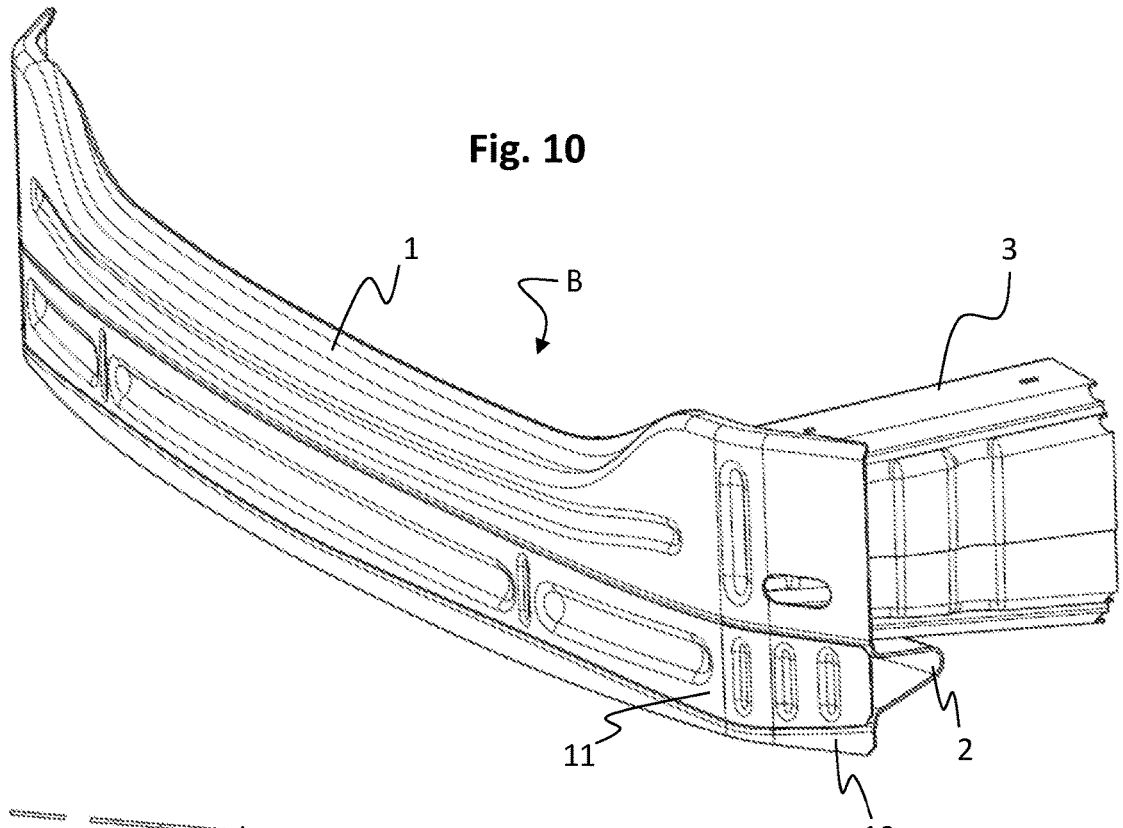
FIG. 10 is a perspective outside view of a bumper beam according to a third embodiment.
Figure 11:
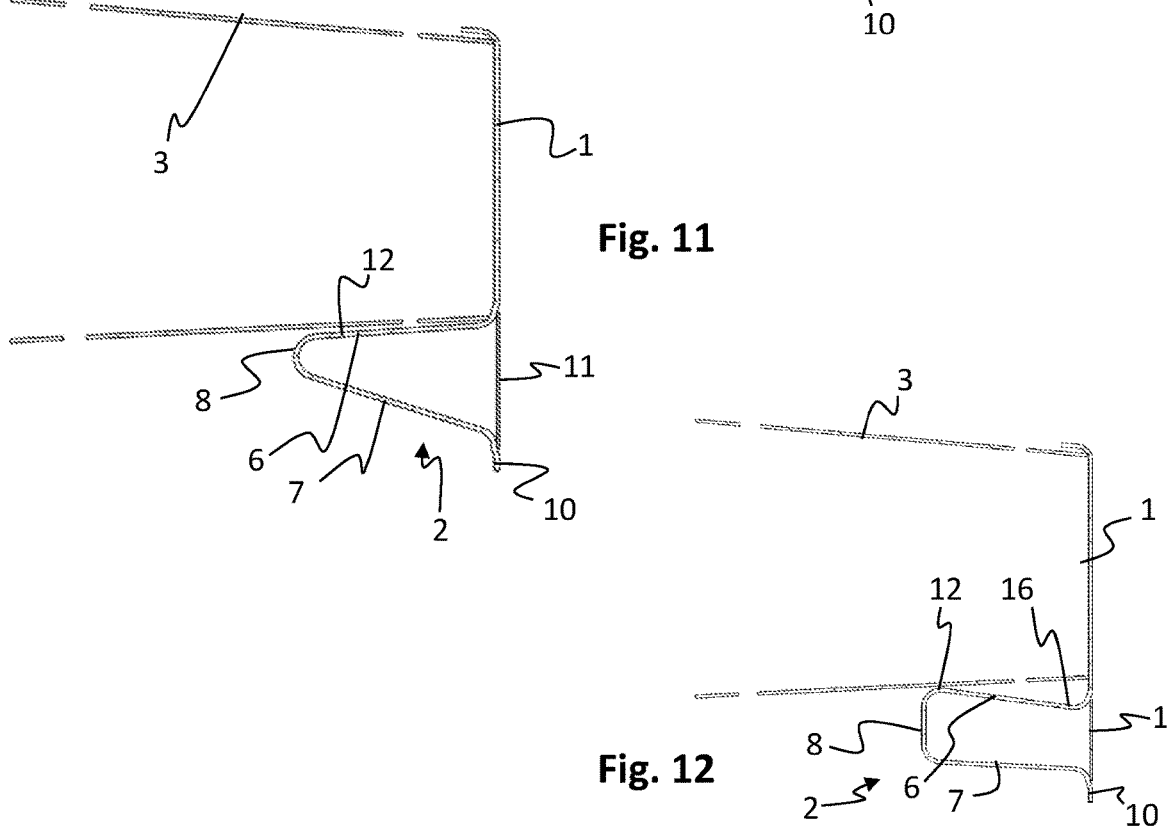
FIG. 11 is a cross sectional view of the bumper beam of the third embodiment and a crash box.

In FIGS. 10 and 11 a bumper beam according to a third embodiment is shown. FIG. 11 is cross sectional view along the attachment portion of the bumper beam B and the crash box 3 shown in FIG. 10. The profile of the off-set member 2 according to the third embodiment resembles the first and second embodiment in that it includes a proximal web 6, a distal web 7, and an inner part 8 interconnecting the proximal and distal web. Unlike the first and second embodiments the inner part 8 of the off-set member 2 of the third embodiment has no extension in the vertical direction. Instead it forms an acute angle between proximal and distal web, such that the distal web 7 extends outwards, slightly diverging from the proximal web 6 to thereby form an opening of a substantially triangular shape between the proximal web 6 and the distal web 7.

As for the first and second embodiments the support section 12 of the third embodiment extends alongside the side of the crash box 3 for the major part of the proximal web 6.

Figure 12:
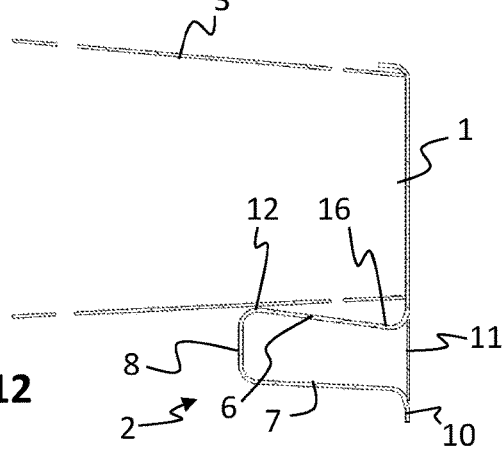
FIG. 12 is a cross sectional view of a bumper beam according to a fourth embodiment and a crash box.

FIG. 12 is cross sectional view of a bumper beam according to a fourth embodiment. In this embodiment the support member 2 includes a curved portion 16 that forms an outer part of the proximal web 6 at a short distance from the side of the crash box 3. Inside of the curved portion 16 the proximal web 6 extends inwards slightly diverging towards the crash box 3. A support section 12 is provided where the proximal web 6 meets the inner part 8, the inner part 8 extending away from the proximal web 6 and the crash box 3, wherein a distal web 7 extends in the forward direction from the inner part 8 and at a distance from the proximal web 6. The distal web 7 includes an end rim 10 that extends away from the main cross member 1. A cover portion 11 is arranged to cover the opening between the proximal web and the distal web.

Above, the invention has been described with respect to four specific and non-limiting embodiments. The scope of the invention also covers any combination of these embodiments as well as other feasible embodiments within the scope of the following claims.

The invention claimed is:

1. A bumper beam (B) comprising an elongate main cross member (1) arranged to be horizontally attached to two crash boxes (3) at attachment portions (4) close to the respective ends of the main cross member (1), the bumper beam (B) having an inner side arranged to attach to outer ends of the rash boxes (3) and an opposite outer side arranged to constitute the outer surface of the bumper beam (B) wherein the main cross member (1) further comprises a mid-portion (5) between said attachment portions (4), and wherein an off-set member (2) is arranged at each attachment portion (4), above or below the main cross member, characterized in that the off-set members (2) comprise a proximal web (6) extending inwards from the main cross member (1), a distal web (7), and an inner part (8) connecting the proximal web (6) to the distal web (7), wherein the distal web (7) extends outwards of and on a distance from the proximal web (6) so as to form an opening there between, wherein a support portion (12) is arranged along the proximal web (6), which support portion (12) is arranged to face a top or a bottom of the crash boxes (3).

2. The bumper beam (B) according to claim 1 wherein the distal web (7) and the proximal web (6) have lengths of a substantially similar magnitude in the inward and outward directions, respectively, such that an end rim (10) of the distal web (7) extends to the outer side of the bumper beam (B) or close to said outer side.

3. The bumper beam (B) according to claim 2 wherein the support portion (12) extends at least along an inner portion of the proximal web (6) at an inward distance from the outer side of the main cross member (1).

4. The bumper beam (B) according to claim 3 wherein the distal web (7) and the proximal web (6) are substantially parallel to each other and wherein the inner part (8) has a certain length so as to separate the distal web (7) from the proximal web (6) and so as to form a hat profile with said webs (6,7).

5. The bumper beam (B) according to claim 3 wherein the proximal web (6) is arranged to extend substantially parallel to the crash box (3), and wherein the distal web (7) extends in an acute angle at the inner part (8) with respect to the proximal web (6) slightly diverging away from the proximal web (6) towards the end rim (10).

6. The bumper beam (B) according to claim 3 wherein a vertical part of the main cross member (1) is arranged to extend past the crash boxes and wherein the proximal web (6) comprises a curved portion (16) at its outer portion from which it extends inwards diverging towards the longitudinal side of the respective crash box (3) to form the support portion (12) close to the inner web (8) that connects the proximal web (6) to the distal web (7).

7. The bumper beam (B) according to claim 2 wherein the end rim (10) extends vertically away from the main cross member (1).

8. The bumper beam (B) according to claim 1 wherein a cover portion (11) is arranged to cover the opening between the distal web (7) and the proximal web (6), the cover portion (11) being attached to both, the proximal web (6) and the distal web (7) so as to offer additional strength to the structure of the off-set members (2).

9. The bumper beam (B) according to claim 1 wherein the main cross member (1) and the off-set-member (2) are integrally formed with each other.

10. The bumper beam (8) according to claim 1 wherein a middle off-set profile (9) is provided to join the off-set members (2) and to extend along, but vertically off-set with respect to, the mid-portion (5) of the main cross member (1).

11. The bumper beam (B) according to claim 10, wherein the middle off-set profile (9) has substantially the same profile as the off-set members (2) and comprises a proximal web (6a) close to the main cross member (1), a distal web (7a) on a distance from the main cross member (1), and inner part (8a) joining said webs (6a, 7 a).

12. The bumper beam (B) according to claim 1, wherein the off-set member (2) is arranged vertically below the main cross member (1).

13. The bumper beam (B) according to claim 1, wherein the bumper beam (B) further comprises two crash boxes (3), one said crash box arranged at each attachment portion (4) and extending inwards from said attachment portion (4).

14. The bumper beam (B) according to claim 13, wherein the support section (12) of each off-set member (2) is arranged to be in sliding contact with the respective crash box (3).

15. The bumper beam (B) according to claim 2, wherein a cover portion (11) is arranged to cover the opening between the distal web (7) and the proximal web (6), the cover portion (11) being attached to both, the proximal web (6) and the distal web (7) so as to offer additional strength to the structure of the off-set members (2).

16. The bumper beam (B) according to claim 2, wherein the main cross member (1) and the off-set-member (2) are integrally formed with each other.

17. The bumper beam (B) according to claim 2, wherein a middle off-set profile (9) is provided to join the off-set members (2) and to extend along, but vertically off-set with respect to, the mid-portion (5) of the main cross member (1).

18. The bumper beam (B) according to claim 2, wherein the off-set member (2) is arranged vertically below the main cross member (1).

19. The bumper beam (B) according to claim 2, wherein the bumper beam (B) further comprises two crash boxes (3), one said crash box arranged at each attachment portion (4) and extending inwards from said attachment portion (4).

20. The bumper beam (B) according to claim 3, wherein the bumper beam (B) further comprises two crash boxes (3), one said crash box arranged at each attachment portion (4) and extending inwards from said attachment portion (4).

\* \* \* \* \*

UNITED STATES PATENT AND TRADEMARK OFFICE
CERTIFICATE OF CORRECTION

PATENT NO. : 10,618,482 B2
APPLICATION NO. : 15/770547
DATED : April 14, 2020
INVENTOR(S) : Tony Haggstrom Page 1 of 1

It is certified that error appears in the above-identified patent and that said Letters Patent is hereby corrected as shown below:

In the Claims

Claim 1, Line 6 (Column 5, Line 55): Delete "rash", and insert --crash--.

Claim 1, Line 8 (Column 5, Line 57): After "(B)", add --,--.

Signed and Sealed this
Nineteenth Day of May, 2020

Andrei Iancu
*Director of the United States Patent and Trademark Office*